(12) United States Patent
Huang et al.

(10) Patent No.: US 8,369,837 B2
(45) Date of Patent: Feb. 5, 2013

(54) TASK MANAGEMENT BASED ON TRAVEL DISTANCE

(75) Inventors: Ronald K. Huang, Milpitas, CA (US); Morgan Grainger, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 12/755,719

(22) Filed: Apr. 7, 2010

(65) Prior Publication Data
US 2011/0250871 A1 Oct. 13, 2011

(51) Int. Cl.
H04M 1/725 (2006.01)
(52) U.S. Cl. .............. 455/412.2; 455/456.1; 455/456.3; 455/502; 455/503; 455/525; 455/171.1; 455/181.1; 455/231; 368/14; 368/21; 368/10; 368/47; 370/328; 370/338
(58) Field of Classification Search .............. 455/412.2, 455/456.1, 456.3, 466.6, 502, 503, 525, 171.1, 455/181.1, 231; 368/14, 21, 10, 47; 370/328, 370/338
See application file for complete search history.

(56) References Cited

U.S. PATENT DOCUMENTS

| 5,797,094 | A | 8/1998 | Houde et al. |
|---|---|---|---|
| 6,445,937 | B1 * | 9/2002 | daSilva ..................... 455/574 |
| 7,072,666 | B1 * | 7/2006 | Kullman et al. ........... 455/456.1 |
| 7,269,629 | B2 | 9/2007 | Zmudzinski et al. |
| 7,639,131 | B2 | 12/2009 | Mock et al. |
| 2002/0067308 | A1 * | 6/2002 | Robertson ................ 342/357.17 |
| 2004/0176107 | A1 * | 9/2004 | Chadha .................... 455/456.5 |
| 2006/0030333 | A1 | 2/2006 | Ward et al. |
| 2006/0068812 | A1 * | 3/2006 | Carro et al. ............... 455/456.3 |
| 2009/0215504 | A1 | 8/2009 | Lando |

* cited by examiner

*Primary Examiner* — Nimesh Patel
(74) *Attorney, Agent, or Firm* — Fish & Richardson P.C.

(57) ABSTRACT

Methods, program products, and systems for task management based on travel distance are disclosed. In general, in one aspect, a method executed on a mobile device can include receiving a request to perform a task in a first subsystem (e.g., an application subsystem) of the mobile device. The request can indicate that the task is to be performed when the mobile device travels at least a threshold distance. The mobile device can determine a duration of silence. The mobile device can configure a second subsystem (e.g., a baseband operating system) of the mobile device to send a notification to the first subsystem notifying that the mobile device has traveled after at least the duration of silence. The first subsystem can receive the notification and determine that the threshold distance has been satisfied based on the received notification. The first subsystem can perform the task upon the determining.

24 Claims, 10 Drawing Sheets

TASK MANAGEMENT BASED ON TRAVEL DISTANCE

TECHNICAL FIELD

This disclosure relates generally to location-based processing on a mobile device.

BACKGROUND

A modern mobile device can incorporate functions of a computer, of a cellular transceiver, or a wireless (e.g., WiFi™) transceiver. For example, the mobile device can perform traditional computer functions, such as executing application programs, storing various data, and displaying digital images. These functions can be performed in an application subsystem of the mobile device. The application subsystem can include an application processor, an application operating system, and various input/output devices.

When the mobile device functions as a cellular transceiver, the mobile device can initiate and receive phone calls, send and receive data over a cellular network, identify cellular tower connections, and determine when and whether to switch cellular towers. Similarly, the mobile device can function as a wireless radio transceiver and send and received data over a wireless network, e.g. a WiFi™ network. These radio-related functions can be performed in a baseband subsystem of the mobile device. The baseband subsystem can include a baseband processor and a baseband operating system. The baseband processor can be an integrated circuit (IC) device (e.g., a Large Scale Integrated Circuit (LSI)) that performs communication functions. The baseband processor can include, for example, a Global System for Mobile Communications (GSM) modem. The baseband processor can be can be integrated with the application processor in a System-on-Chip (SoC). In general, the application subsystem can consume more power than the baseband subsystem when activated.

SUMMARY

Methods, program products, and systems for task management based on travel distance are disclosed. In general, in one aspect, a method executed on a mobile device can include receiving a request to perform a task in a first subsystem (e.g., an application subsystem) of the mobile device. The request can indicate that the task is to be performed when the mobile device travels at least a threshold distance away from an initial location. The mobile device can determine a duration of silence. The mobile device can configure a second subsystem (e.g., a baseband operating system) of the mobile device to send a notification to the first subsystem notifying that the mobile device has traveled. The notification can be sent by a notification function after at least the duration of silence. The first subsystem can receive the notification and determine that the threshold distance has been satisfied based on the received notification. The first subsystem can perform the task upon the determining.

In general, in one aspect, a method of task management based on travel distance can include, in a first subsystem of the mobile device, receiving a notification generated by functions of a second subsystem of the mobile device, the notification informing the first subsystem that a location change of the mobile device has occurred; determining a duration of silence for the first subsystem based on the location change; and configuring the first subsystem to a power saving mode, the power saving mode to be effective for the duration of silence.

The details of one or more implementations of task management based on travel distance are set forth in the accompanying drawings and the description below. Other features, aspects, and advantages of task management based on travel distance will become apparent from the description, the drawings, and the claims.

BRIEF DESCRIPTION OF THE DRAWINGS

Like reference symbols in the various drawings indicate like elements.

DETAILED DESCRIPTION

Overview of Task Management Based on Travel Distance

Figure 1:
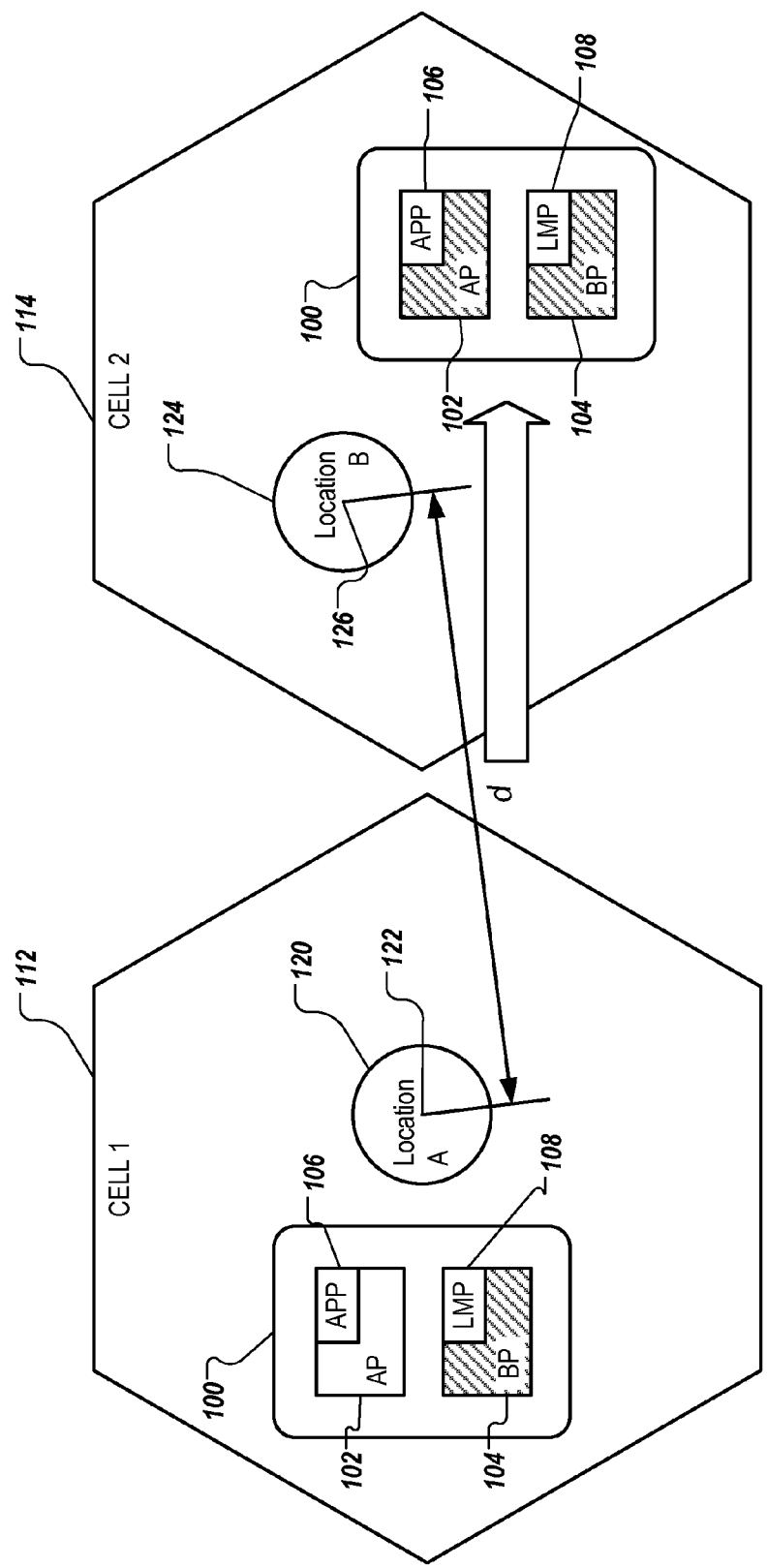
FIG. 1 is an overview of techniques of task management based on travel distance.

FIG. 1 is an overview of techniques of task management based on travel distance. Mobile device 100 can be an exemplary mobile device that implements the techniques of task management based on travel distance. Mobile device 100 can include both application subsystem 102 that performs functions traditionally performed on a computer, and baseband subsystem 104 that performs communication functions traditionally performed on a cellular telephone.

Application subsystem 102 can perform various tasks, including managing application program 106. Application program 106 can be configured to reside in memory of mobile device 100, and to be invoked or notified when mobile device 100 travels a threshold distance from first location to a second location. In various implementations, the first location can be a specified location or an unspecified location. In some implementations, the first location can be a point or area represented by geographic coordinates. The coordinates can be explicitly specified, for example, programmatically or by a user. In some implementations, the first location can be an arbitrary location from which a travel distance is calculated. For example, application program 106 can be configured to be invoked or notified when the mobile device has traveled 300 miles, without designating a particular first location or a second location. The threshold distance can be a linear distance between the first location and the second location.

A location of mobile device 100 can be determined in various ways. In various implementations, the location can be determined using signals from a global positioning system (e.g., GPS), triangulation of wireless access gateways (e.g., WiFi access points), or signals from a cellular communications network.

Baseband subsystem 104 can be used to determine the current location of mobile device 100 using signals from the cellular communication network. Baseband subsystem 104 can be configured to monitor various parameters of the cellular communication network. The parameters, or location identifiers, can be used to determine a current location of mobile device 100. The location identifiers can include, for example, a mobile country code (MCC), a mobile network code (MNC), a location area code (LAC), and a cell identifier (cell ID) of the cellular communication network. Baseband subsystem 104 can monitor these parameters using location monitoring program 108. Location monitoring program 108 can be configured to send a notification to application subsystem 102 upon detecting a change (e.g., from a first cell ID to a second cell ID).

The change of location identifiers can indicate a change of location. For example, a change of current cell ID from a first cell ID to a second cell ID can indicate mobile device 100 has moved from a first cell to a second cell. To illustrate, a first cell ID representing cell 112 can correspond to location 120. Location 120 can be determined in various ways. In some implementations, location 120 can be an area having a geometric shape (e.g., a circular shape or a random shape). The geometric shape can have a center. The center can be a centroid (e.g., center of gravity), a mean center, a center of a minimum bounding rectangle (MBR) of location 120, a center of a smallest circle that completely encloses location 120, a center of a largest inscribed circle of location 120, or a center defined using any geometric or statistic (e.g., Monte Carlo) method. For example, center 122 of location 120 can correspond to a geographic location of a transceiver (e.g., cell tower) of cell 112. Center 126 of location 124 can be calculated statistically, using an average of locations of location-aware mobile devices when the cell IDs of the mobile devices represent cell 114. Locations 120 and 124 each can have a radius, representing an error margin.

When mobile device travels from cell 112 identified by the first cell ID to cell 114 identified by a second cell ID, location monitoring program 108 can detect the change of cell IDs and send the notification of the change of cell IDs to application subsystem 102 as a notification of location change. The notification can include one or more of the location identifiers (e.g., cell IDs, LACs, MNCs, or MCCs). For example, the notification can include the second cell ID representing cell 114.

Application subsystem 102, upon receiving the notification, can determine location 124 in various ways. Application subsystem 102 can determine location 124 by performing a lookup using the second cell ID. The lookup can be performed in a database in application subsystem 102, by a request to a remote server, or through a user interface. Application subsystem 102 can, additionally or alternatively, invoke a GPS function or a triangulation function of mobile device 100 and determine location 124. Location 124 can be designated as a current location of mobile device 100.

Mobile device 100 can determine a travel distance by comparing the current location (e.g., location 124) with a previous location (e.g., location 120). The previous location can be stored on a storage device during a previous notification from baseband subsystem 104. The previous notification can be the last notification sent prior to the current notification, or an earlier notification. To determine the travel distance, mobile device 100 can calculate a distance (e.g., distance "d" of FIG. 1) between center 126 of the current location with center 122 of the previous location, and use the distance as an estimate of the travel distance of mobile device 100. In some implementations, the estimate of the travel distance can be associated with an error margin. The error margin can be determined by the error margins (e.g., radii) of locations 120 and 124.

Mobile device 100 can be configured to perform a task based on the travel distance. The task can include a system task or a task for invoking or notifying application program 106. For example, the task can include ringing an alarm or performing a vibration. The volume of the alarm or the intensity of the vibration can correspond to the travel distance. The task can include creating a folder (e.g., a file directory) of digital images and storing digital images taken at or near location 120 into the folder. When the travel distance satisfies the threshold distance, application subsystem 102 can perform the task.

To conserve battery power of mobile device 100, application subsystem 102 can be set to a power-saving operating mode (e.g., standby mode or sleep mode), after a period of idling (e.g., one minute), as shown in state A of mobile device 100. In the power-saving mode, non-essential components of application subsystem 102 can be temporarily suspended. For example, an image of volatile memory, if any, can be cached on a non-volatile storage device, and the power supply to the volatile memory can be disconnected. Non-essential parts of the core of the application processor can be turned off. The clock of the processor can be slowed down. Application program 106 can be cached on the non-volatile storage device. When application subsystem 102 is set in power saving mode, baseband subsystem 104 can remain active, continuously or intermittently monitoring the cell IDs, LACs, MNCs, or MCCs.

Application subsystem 102 can "wake up," or be activated, from the power-saving mode. The activation can set application subsystem 102 to an active operating mode, as shown in state B of mobile device 100. The activation can be triggered by a timer event, a user event, or a notification from baseband subsystem 104 that monitors the cell IDs, LACs, MNCs, or MCCs. When application subsystem 102 is set to the active operating mode, application subsystem 102 can perform various travel distance calculations, and determine whether program 106 needs to be invoked or notified.

To conserve battery power, it can be logical to allow application subsystem to stay in power-saving mode as long as possible. Baseband subsystem 104 can detect a location change when the travel distance is significantly less than the threshold distance. For example, in various cellular communication networks, two cells can cover overlapping geographic areas. Mobile device 100 can switch from a first cell to a second cell due to signal strength change rather than location change. For example, when an obstacle travels into a line of sight between mobile device 100 and a first cell tower and interferes with the signal from the first cell tower, mobile device 100 can switch to a second cell tower. Thus, baseband subsystem 104 can detect a cell change when mobile device is not moving. In addition, a threshold distance can be large enough (e.g., 300 miles) that under typical circumstances, mobile device 100 is unlikely to be able to travel the threshold distance in certain amount of time (e.g., one hour). In these circumstances, application subsystem 102 can remain in the power-saving mode, rather than wake up frequently to examine whether the threshold distance is satisfied.

In some implementations, baseband subsystem 104 can be configured to remain inactive for a period of time (a duration of silence) during which changes in monitored parameters do not cause a notification to application subsystem 102. A control switch (e.g., a control bit) can be used to configure whether baseband subsystem 104 does or does not send the notification to application subsystem 102. For example, when the threshold distance is 300 miles, mobile device 100 can determine that a duration of silence can be set to one hour. The control switch in baseband subsystem 104 can set to off, such that baseband subsystem 104 does not notify application subsystem 102 even when a location change is detected. Application subsystem 102 can be set to a power-saving operating mode without being disturbed by a location change notification from baseband subsystem 104. In the duration of silence, application subsystem 102 can still be waken by various events (e.g., a user event or a timer event) other than the location change notification.

At the end of the duration of silence, a timer device or timer process that tracks time can be used to activate application subsystem 102 by setting application subsystem 102 to an active operating mode. The timer device can be a power management device. The timer process can be a process that executes in mobile device 100 even when application subsystem 102 is in power-save operating mode.

Upon being activated by the timer device or timer process, application subsystem 102 can configure baseband subsystem 104 by setting the control switch to on, to allow baseband subsystem 104 to send a notification to application subsystem 102 when baseband subsystem 104 detects a location change.

In some implementations, when application subsystem 102 is activated from a power-saving mode, application subsystem 102 can determine if notification can be turned off for another duration of silence. If, for example, application subsystem 102 determines that mobile device has traveled a travel distance, and the travel distance is less than a certain percentage of the threshold distance, indicating that mobile device 100 remains close to location 120, application subsystem 102 can determine that another duration of silence can apply. Application subsystem 102 can configure baseband subsystem 104 by setting the control switch to off, and resetting the timer device or timer process, to allow application subsystem 102 to be set to a power-saving operating mode without being disturbed by a location change notification for another duration of silence.

If, on the other hand, the travel distance is large, indicating that mobile device 100 has traveled a distance that is close to the threshold distance, application subsystem 102 can leave the control switch of baseband subsystem 104 at the on position. The travel distance can be close to the threshold distance, for example, when the travel distance is within an error margin of the threshold distance.

Configuring baseband subsystem 104 not to notify application subsystem 102 for a duration of silence can be advantageous, as application subsystem 102 can remain in power-saving operating mode longer, and be set to active operating mode less frequently, thus conserving battery power. The advantage can be especially pronounced when mobile device 100 is located in an area dense with cellular towers (e.g., in an urban downtown area) where mobile device 100 can switch cells frequently without traveling far.

Figure 2:
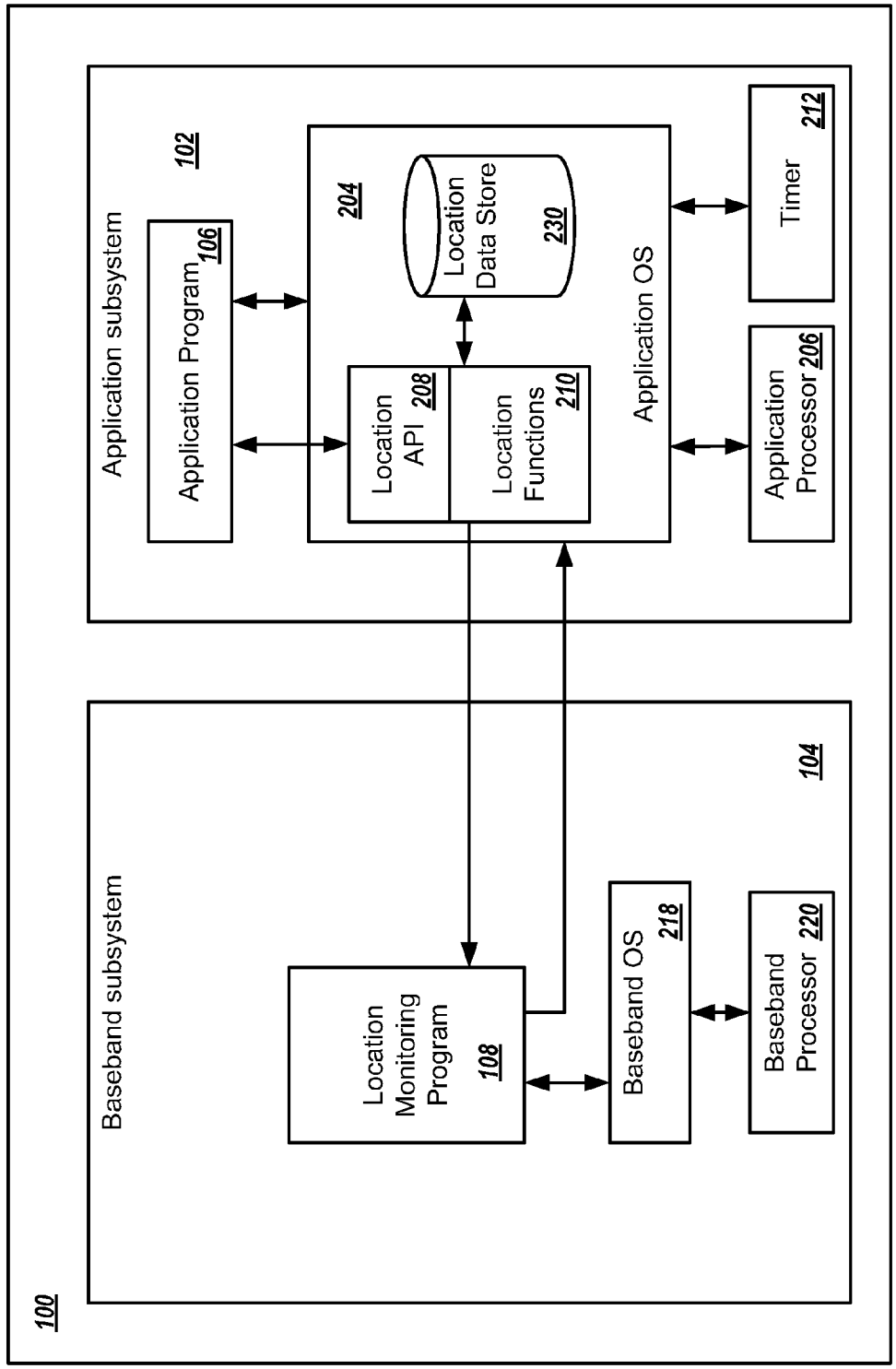
FIG. 2 is a block diagram illustrating exemplary components of a mobile device implementing task management based on travel distance.

FIG. 2 is a block diagram illustrating exemplary components of mobile device 100 implementing task management based on travel distance. Mobile device 100 can include, among other components, application subsystem 102 and baseband subsystem 104. Application subsystem 102 can include application operating system 204 and application processor 206. One or more application programs 106 can execute in application subsystem 102. Application operating system 204 can include various location functions 210. Location functions 210 can include, for example, functions that can determine a current geographic location from a GPS receiver, functions that can triangulate the current geographic location using wireless access points, and functions for communicating with baseband subsystem 104. Location functions 210 can be exposed to application programs 106 through location API 208. Location API 208 can have a public interface.

Application subsystem 102 can include location data store 230. Location data store 230 can store threshold distances mapped to multiple application programs 106. Various application programs 106 can be associated with various threshold distances. For example, a first application program 106 can be configured to be invoked when mobile device has traveled 20 miles. A second application program 106 can be configured to be invoked when mobile device has traveled 300 miles. Location data store 230 can store a file path or a process identifier (PID) of each application program 106, and the corresponding threshold distances.

Location data store 230 can store one or more initial locations from which travel distance of mobile device can be calculated. The initial locations can be represented using latitude, longitude, and optionally, altitude coordinates. When multiple threshold distances are present, each distinct threshold distance can correspond to a initial location that can be updated when mobile device 100 has travel the distinct threshold distance. For example, location data store 230 can store a first initial location that corresponds to the threshold distance of 20 miles, and a second initial location that corresponds to the threshold distance of 300 miles. The first initial location can be updated to a current location, for example, when mobile device 100 has traveled 20 miles from the first initial location. The second initial location can be updated to a current location can be updated when mobile device 100 has traveled 300 miles from the second initial location.

Location data store 230 can store one or more location identifiers. The location identifiers can be identifiers of wireless access gateways associated with geographic locations. For example, location data store 230 can store various cell IDs, as well as longitude and latitude coordinates associate with the cell IDs. The longitude and latitude coordinates can correspond to centers 122 and 126 of locations 120 and 124. When application subsystem 102 receives a notification from baseband subsystem 104, application subsystem 102 can retrieve the cell ID from the notification, and perform a lookup in location data store 230 to determine a current location. A travel distance can be determined by calculating a distance between the current location and each initial location. The identifiers of wireless access gateways can be downloaded from a server remote to mobile device 100, and updated when mobile device 100 has traveled a specified update distance. The update distance can be a threshold distance that corresponds to the communication range of the wireless access gateways. The updating function can be one of the tasks managed using travel distance. In some implementations, the travel distance can be measured from a current location, for example, by tracing back. Mobile device 100 can compare various previously stored locations with the current location, and determine the travel distance.

Application subsystem can include timer 212. Timer 212 can include a hardware device, or a software process, or both, that can activate application subsystem 102 after a specified amount of time. For example, timer 212 can be configured to set application subsystem 102 to an active operating mode after one hour. The specified amount of time can be configurable, and can be reset.

Baseband subsystem 104 can include location monitoring program 108, baseband operating system 218 and baseband processor 220. Location functions 210 can communicate with location monitoring program 108 of baseband subsystem 104. Baseband subsystem 104 can include a control switch that, when switched on, allows baseband subsystem 104 to send a notification to application subsystem 102 upon detecting a location change, and when switched off, suspends notification to application subsystem 102 even when a location change is detected. Suspending location change can reduce the frequency that application subsystem 102 is activated, when there is a high likelihood that mobile device 100, although moving, has not traveled sufficiently far.

Figure 3:
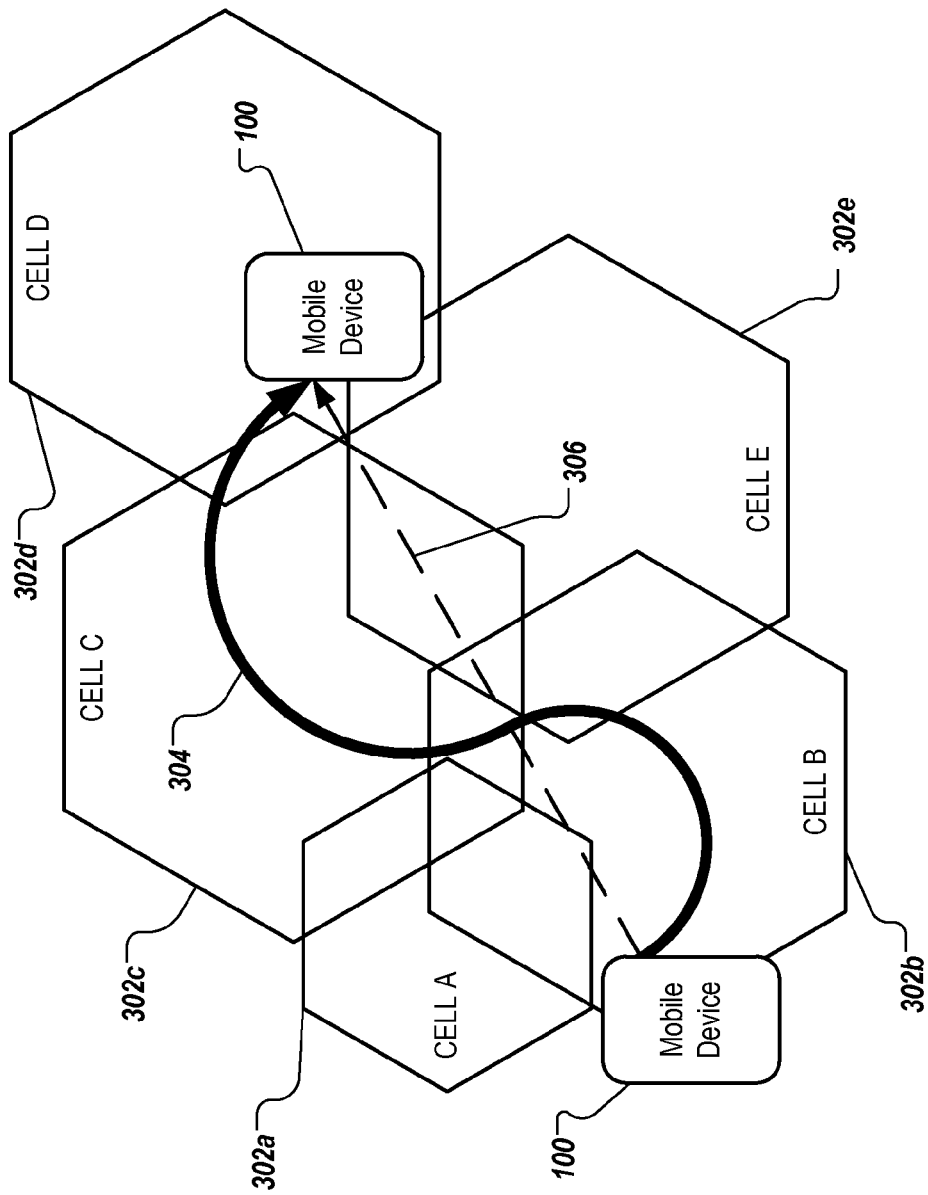
FIG. 3 illustrates an exemplary travel path of a mobile device implementing task management based on travel distance.

FIG. 3 illustrates an exemplary travel path of a mobile device implementing task management based on travel distance. Mobile device 100 can be configured to perform certain tasks when mobile device has traveled a threshold distance. Mobile device 100 can travel, following trajectory 304, in a cellular network that includes cells 302a, 302b, 302c, 320d, and 302e. Cells 302a-e can overlap one another geographically. As mobile device 100 travels, mobile device 100 can be served by cell towers of the various cells 302a-e based on distance between mobile device 100 and the cell towers, or strength of signals from the cell towers, or both. For example, mobile device 100 can be served by cell 302b initially, switch to cell 302e, then to cell 302c, and to cell 302d, as mobile device 100 travels along trajectory 304.

Each switch of cells can cause a change of cell ID to a current cell ID, which can be detected by baseband subsystem 104 of mobile device 100. The changes can indicate location changes that approximate trajectory 304. Baseband subsystem 104 can send a notification to application subsystem 102 when the change of cell IDs is detected. If the threshold distance is sufficiently large, application subsystem 102 can be set to a power-saving mode, and notifications from baseband subsystem 104 can be suspended for a duration of silence. For example, when mobile device 100 switch cell IDs as mobile device 100 travels from cell 302b to cell 302e, and then from cell 302e to cell 302c during the duration of silence, baseband subsystem 104 need not send notifications to application subsystem 102. In some implementations, application subsystem 102 can be configured to ignore the notifications from baseband subsystem 104 if the notifications are sent.

After the duration of silence has passed, the notifications from baseband subsystem 104 can be activated. For example, mobile device 100 can travel from cell 302c to cell 302d after the duration of silence has passed. Baseband subsystem 104, detecting a change of cell IDs, can send a notification to application subsystem 102, indicating that the current cell ID is cell ID of cell 302d.

Application subsystem 102 can determine travel distance 306 based on the cell ID of cell 302d. Travel distance 306 need not correspond to the actual distance traveled by mobile device 100 (e.g., distance following trajectory 304). In some implementations, travel distance 306 can be determined using estimated locations of cell 302b and cell 302d. In some implementations, travel distance 306 can be determined using one or more triangulated locations or GPS locations of mobile device 100.

Mobile device 100 can be a location-aware mobile device that includes hardware and software for determining a location using GPS signals or triangulation from wireless access points. When application subsystem 102 receives a location change notification from baseband subsystem 104, application subsystem 102 can determine the current location using the GPS signals or triangulation. The current location can be used to calculate travel distance 306 and can be stored in location data store 230 as initial location for determining a next move.

Figure 4:
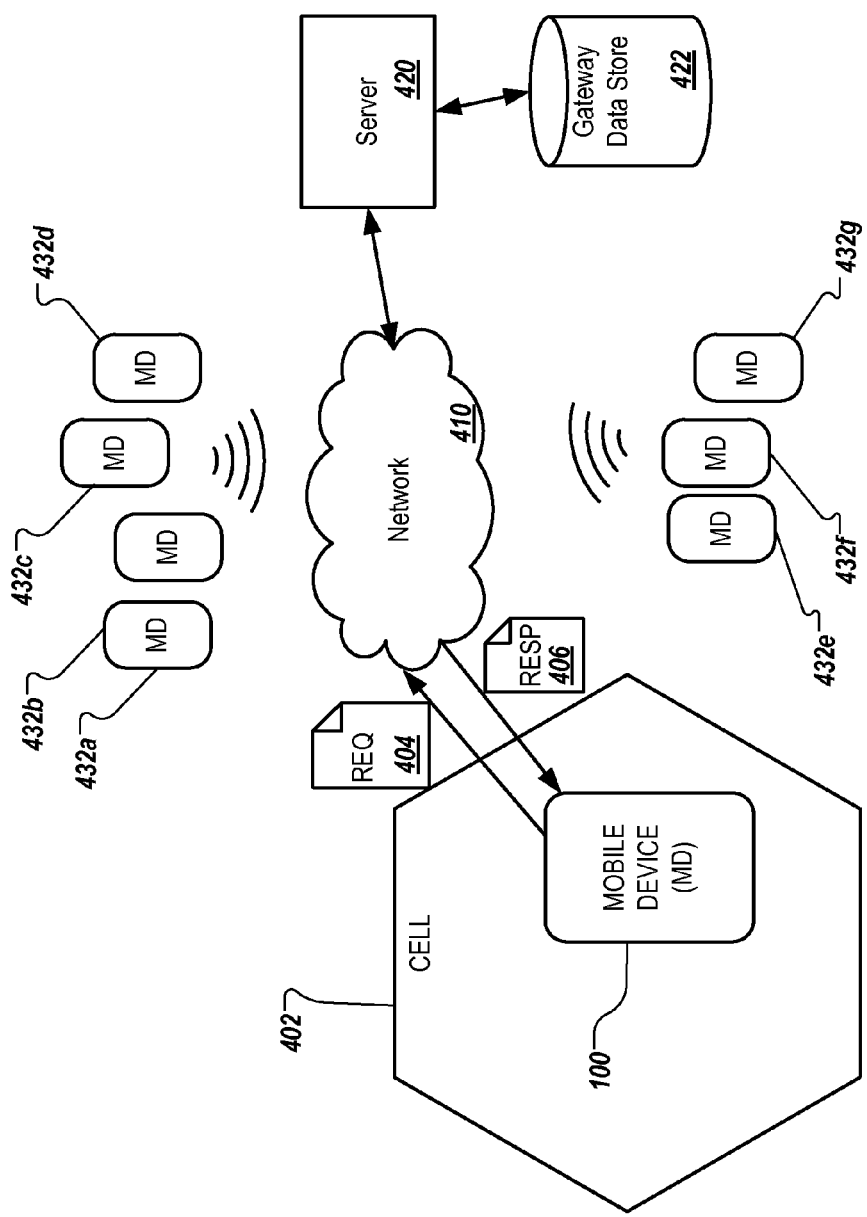
FIG. 4 illustrates an exemplary interaction between a mobile device implementing task management based on travel distance and a server.

FIG. 4 illustrates an exemplary interaction between mobile device 100 implementing task management based on travel distance and server 420. Mobile device 100 can include application subsystem 102 that includes location data store 230. Location data store 230 can store one or more location identifiers (e.g., cell IDs) and corresponding locations. The location identifiers can include cell IDs in a particular region (e.g., a country). Mobile device 100 can request an update of the location identifiers stored in location data store 230 from server 420 when mobile device 100 is located in cell 402.

After a duration of silence has expired, application subsystem 102 can receive a notification from baseband subsystem 104. The notification can specify that a current cell ID is cell ID of cell 402. The current cell ID can be a location identifier that is not currently stored in location data store 230. For example, mobile device 100 can travel in an airplane. During the travel, mobile device 100 can be set to an "airplane" mode in which mobile device 100 does not detect cell ID change. By airplane, mobile device 100 can travel from a first country to a second county. When application subsystem 102 receives a location change notification (e.g., when mobile device 100 disembarks in the second country), the new cell ID in the second country (e.g., cell ID of cell 402) may not be stored in location data store 230. For example, in some implementations, location data store 230 can store cell IDs of a particular country (e.g., the first country). When mobile device 100 fails to find a current cell ID in location data store 230, mobile device 100 can request an update from server 420.

Mobile device 100 can transmit request 404 to a server 420 through network 410 to request location identifiers that includes the current cell ID. Request 404 can include current location information as well as type of location identifiers requested. The current location information can include, for example, one or more of current cell ID, current LAC, current MNC, and current MCC. The type of location identifiers can include whether mobile device 100 seeks identifiers of wireless access points, cell IDs, LACs, MNCs, or MCCs.

Upon receiving request 404, server 420 can identify one or more location identifiers from gateway data store 422 to be transmitted to mobile device 100. Identifying the location identifiers from gateway data store 422 can include, for example, identifying some or all cell IDs corresponding to the LAC or MCC in request 404. The identified location identifiers, as well as locations associated with the location identifiers, can be transmitted to mobile device 100 in response 406. Upon receiving response 406, mobile device 100 can retrieve the location identifiers and associated locations and store the retrieved location identifiers and associated locations in location data store 230.

The locations associated with the location identifiers stored in gateway data store 422 can be determined using various geometric and statistical calculations. For example, a location associated with a cell ID of a particular cell can be determined using locations of location-aware mobile device 432a, 432b, 432c, 432d, 432e, 432f, and 432g that are within the cell. Location-aware mobile device 432a-g can transmit geographic coordinates of the current locations of location-aware mobile device 432a-g as well as the cell ID to server 420. Server 420 can determine the location of the cell ID by averaging the geographic coordinates. The location determined by the averaging can be designated as a most probable location of a mobile device (e.g., mobile device 100) that is in the cell.

Exemplary Application Program Invoked Based on Travel Distance

Figure 5:
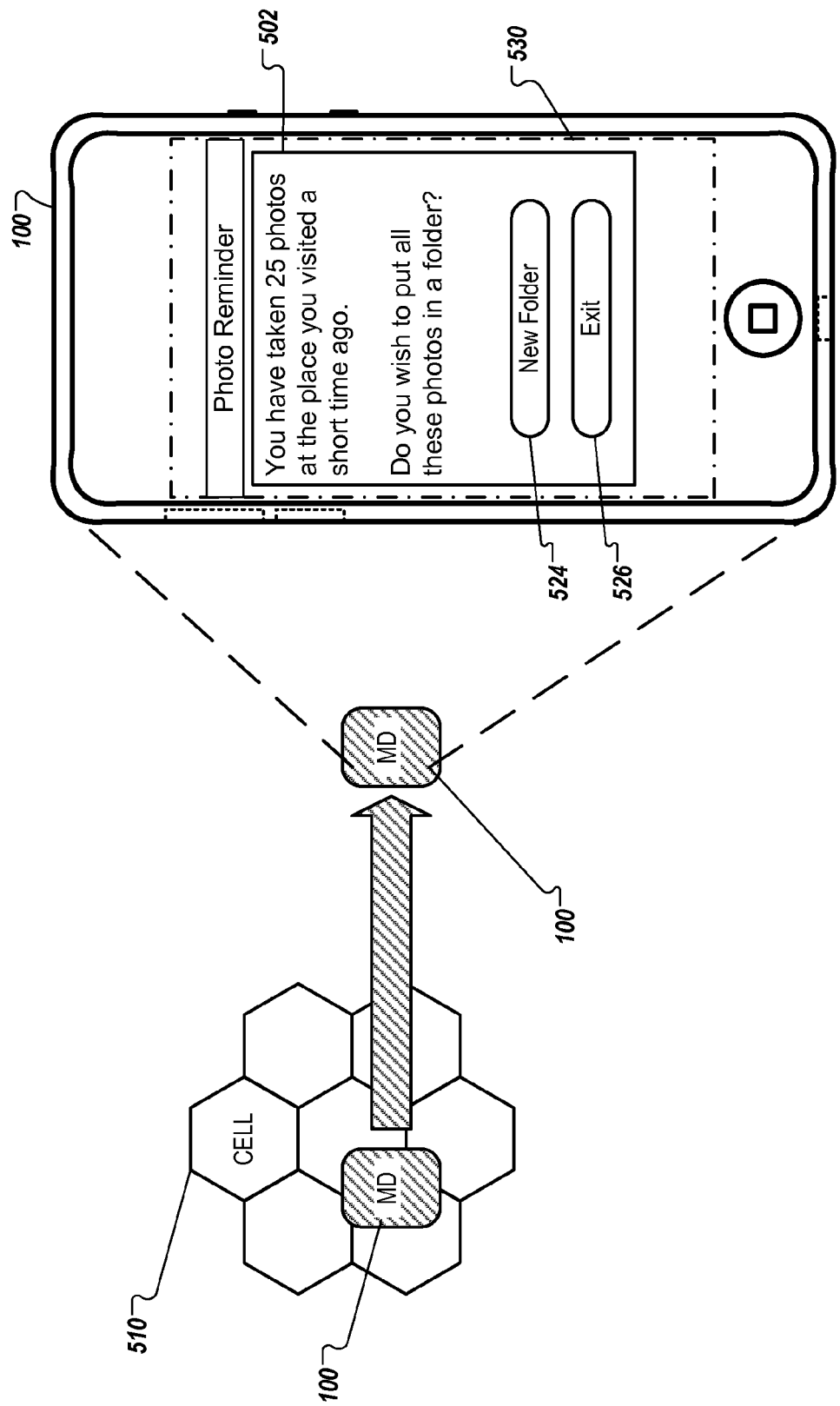
FIG. 5 illustrates an exemplary user interface of an application program activated when a mobile device has traveled a distance away from an initial location.

FIG. 5 illustrates an exemplary user interface of an application program activated when a mobile device has traveled a distance away from an initial location.

In FIG. 5, user interface 502 of an exemplary photo reminder application program is displayed on display screen 530 of mobile device 100. Mobile device 100 can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices. Display screen 530 can include a multi-touch sensitive screen that can receive user inputs.

The photo reminder application program can be an application program that is configured to be invoked or notified when mobile device 100 has traveled a threshold distance (e.g., 300 miles) from an initial location. Upon invocation or notification, the photo reminder application program can identify digital images (or audio and video recordings), if any, that were created at or near the initial location, and prompt a user, in user interface 502, to organize the digital images by putting the digital images in a particular directory (e.g., a folder). The photo reminder application program can identify the digital images, for example, by comparing time stamps of the digital images with time stamps of an event log of mobile device 100. The event log can include a system log file that records events including whether and when application subsystem 102 enters power-saving mode, and whether and when application subsystem 102 is notified of a location change after a duration of silence.

Exemplary interface 502 can be displayed on mobile device 100 when mobile device 100 is at least the threshold distance away from the initial location. When mobile device 100 travels within a group of cells 510, a change of cell IDs triggered by mobile device 100 moving from one particular cell to another cell need not cause baseband subsystem 104 to notify application subsystem 102 during a duration of silence. Thus, application subsystem 102 need not be activated frequently in order to determine whether the photo reminder application program needs to be invoked. A notification of location change can be sent when the duration of silence expires.

User interface 502 can include user input button 524 that allows a user to create a new directory (e.g., a new folder) for the digital images taken at the initial location, and user input button 526 that allows a user to quit the photo reminder application program.

Exemplary Processes of Task Management Based on Travel Distance

Figure 6:
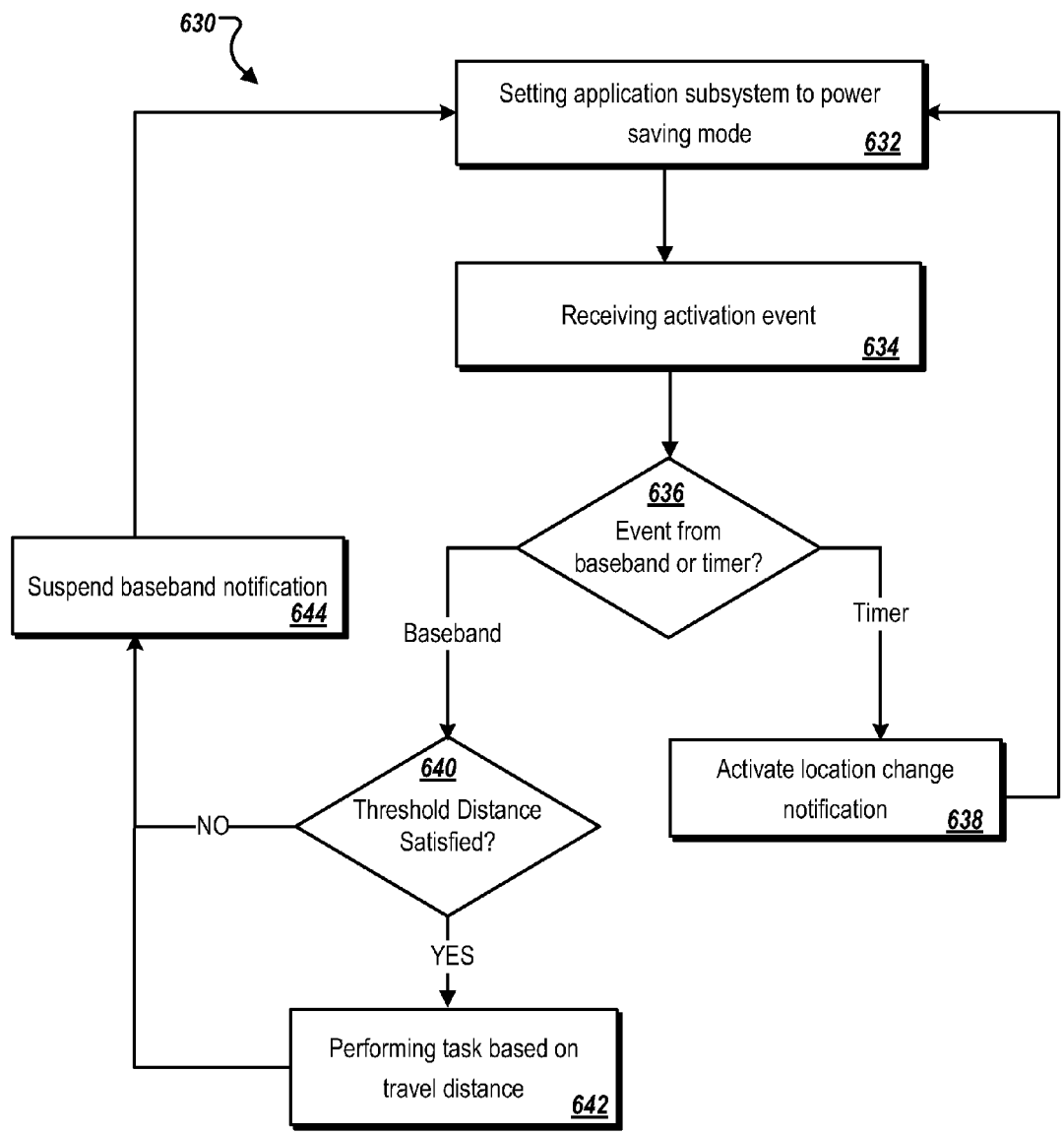
FIG. 6 is a flowchart illustrating a first exemplary process of task management based on travel distance.

FIG. 6 is a flowchart illustrating exemplary process 630 of task management based on travel distance. Mobile device 100 can receive a request to perform a task when mobile device 100 travels a threshold distance away from an initial location. The initial location need not be specified. Process 630 can be initiated by a user, for example, when the user activates functions of task management based on travel distance.

Mobile device 100 can set (632) application system 102 to a power-saving mode. Application system 102 can receive (634) an activation event. The activation event can be an event that is configured to set application system 102 to an active operating mode. The activation event can include a user event, a notification of location change from baseband subsystem 104 of mobile device, or a signal from timer 212 of mobile device 100.

Upon receiving the activation event, application subsystem 102 can enter an active operating mode. Application subsystem 102 can determine (636) what type of event has been received. If the event is a user event (e.g., a user invoking application subsystem 102), application subsystem 102 can process the user event. If the activation event is a timer event indicating that a duration of silence has passed, application subsystem 102 can activate (638) location change notification functions of baseband subsystem 104. Activating the location change notification function of baseband subsystem 104 can include setting a control switch to an "on" position for one or more location notification functions in a tiered manner. Baseband subsystem 104 can be configured to notify application subsystem 102 when a cell ID change occurs, when a LAC change occurs, when an MNC change occurs, or an MCC change occurs. For example, baseband subsystem 104 can be configured to notify application subsystem 102 when a cell ID change is associated with a LAC change, indicating that mobile device 100 has traveled into a new location area. Tiered notification can be advantageous when the threshold distance is large (e.g., 1000 miles). Application subsystem 102 can be set (632) to power-saving mode, after a specified idling period of time.

If the activation event is a baseband notification of a location change, application subsystem 102 can determine (640) whether one or more threshold distances are satisfied. Application subsystem 102 can make the determination by extracting a location identifier (e.g., cell ID) from the notification, determining a current location from location data store 230, and comparing the current location with one or more initial locations stored in location data store 230. The comparing can include calculating a travel distance between each initial location and the current location.

If a threshold distance is satisfied, application subsystem 102 can perform (642) one or more tasks based on the threshold distance that is satisfied. The tasks can include invoking or notifying application programs that are configured to be invoked or notified when a threshold distance is satisfied. For example, a first application program can correspond to a threshold distance of 20 miles, and a second application program can correspond to a threshold distance of 300 miles. If a current location indicates that mobile device 100 has traveled 30 miles, the first application program can be invoked or notified. The current location can be designated as a new initial location associated with the first application program. Mobile device 100 can travel back and forth between two locations. For example, mobile device can travel 30 miles twice each day. Therefore, it is possible that the first application program can be invoked an indefinite number of times before the second application program is invoked.

Application subsystem 102 can suspend (644) baseband notification of location change from baseband subsystem 104. Suspending baseband notification can include reviewing the initial locations and threshold distances stored in location data store 230, and determining a duration of silence based on result of the review. In some implementations, determining the duration of silence can be based on a moving speed of mobile device 100. The moving speed can be calculated using the travel distance and time that mobile device 100 took to travel the distance. For example, if a threshold distance is one mile, and the moving speed of mobile device 100 is determined to be zero miles per hour, the duration of silence can be set to a specified value (e.g., one hour). If the threshold distance is one mile, and the moving speed of mobile device 100 is determined to be ten miles per hour, the duration of silence can be set to zero.

Suspending baseband notification can include configuring a timer (e.g., timer 212) to set the duration of silence. Upon configuring the timer, application subsystem 102 can configure a control switch of baseband subsystem 104 such location change notification is suspended. Application subsystem 102 can activate the timer and set (632) application subsystem 102 to a power-saving mode. Process 630 can terminate when the user deactivates travel distance based task management functions of mobile device 100.

Figure 7:
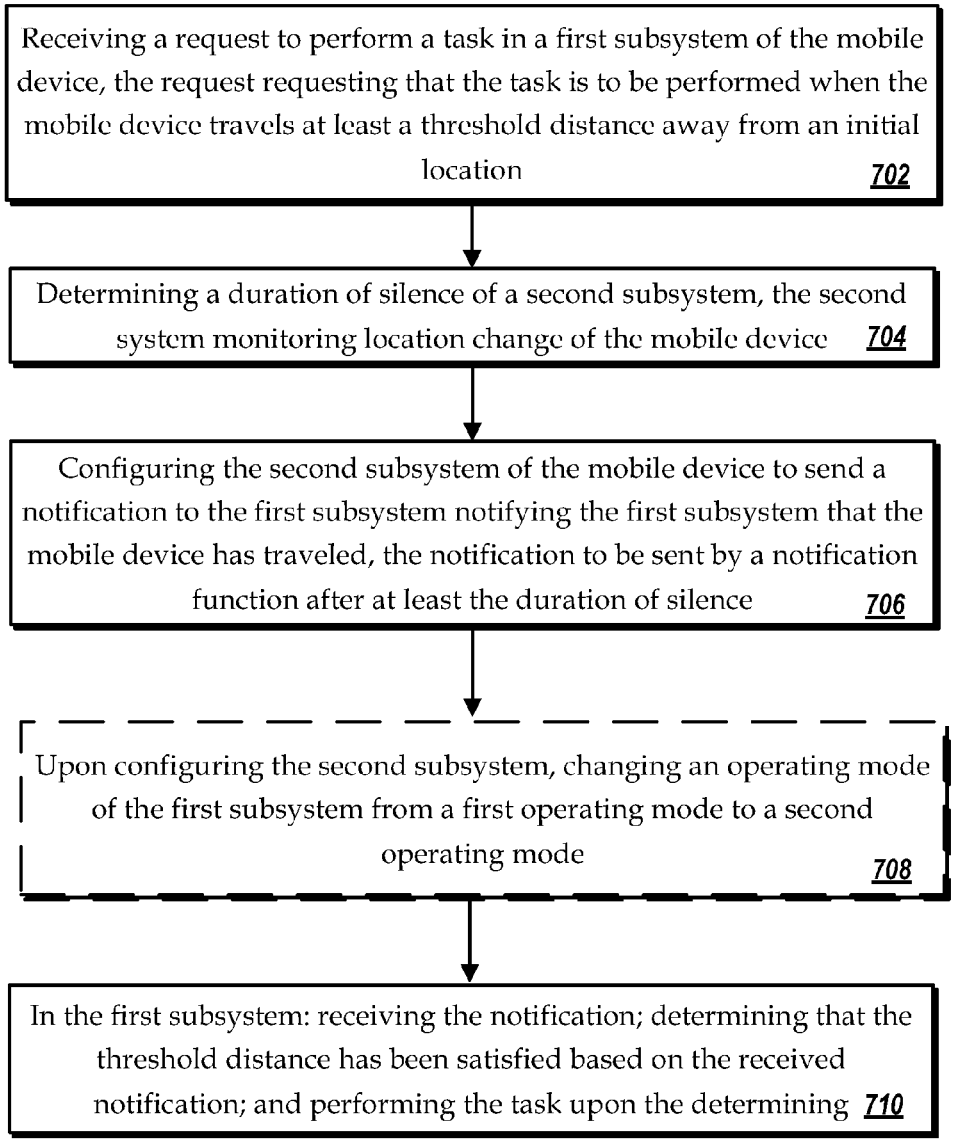
FIG. 7 is a flowchart illustrating a second exemplary process of task management based on travel distance.

FIG. 7 is a flowchart illustrating exemplary process 700 of task management based on travel distance. Exemplary process 700 can be executed on a mobile device (e.g., mobile device 100).

Mobile device 100 can receive (702) a request to perform a task in a first subsystem (e.g., application subsystem 102) of mobile device 100. The request can specify that the task is to be performed when mobile device 100 travels at least a threshold distance away from an initial location. The request can originate from a user input. For example, a user can configure one or more application programs to be invoked based on a travel distance. The request can be associated with the application programs. For example, an application program stored on server 420 can be associated with invocation conditions that specifies that the application program is to be automatically invoked when mobile device 100 travels a threshold distance (e.g., x miles). The application program can be downloaded to mobile device 100.

The task to be performed can include invoking the application program in application subsystem 102 when the application program is not active, e.g., if the application program is not loaded into memory of mobile device 100. The task can also include notifying the application program that a location change has occurred, when the application program is active. The application program can be active when the application program is loaded into memory of mobile device 100 and is being executed in a foreground (e.g., when the application program interacts with a user) or a background (e.g., the application program does not interact with the user).

Mobile device 100 can determine (704) a duration of silence of a second subsystem (e.g., baseband subsystem 104). The second subsystem can monitor location change of mobile device 100 (e.g., by monitoring changes in cell IDs). The determining can be performed in application subsystem 102. Determining the duration of silence can include determining the duration of silence based on the threshold distance. For example, a length of the duration of silence can be proportional to the threshold distance. In some implementations, when more than one threshold distances are specified, determining the duration of silence can include determining the duration of silence based on a shortest threshold distance. In some implementations, determining the duration of silence can include determining the duration of silence based on the threshold distance and a moving speed of mobile device 100. For example, the duration of silence can be inversely proportional to the moving speed.

The first subsystem can configure (706) the second subsystem (e.g., baseband subsystem 104) of mobile device 100 to send a notification to the first subsystem notifying the first subsystem (e.g., application subsystem 102) that mobile device 100 has traveled. The notification can be sent by a notification function of baseband subsystem 104 (e.g., location monitoring program 108) after at least the duration of silence. Configuring the second subsystem can include suspending the notification functions of the second subsystem, setting a timer (e.g., timer 212) to activate the first subsystem after the duration of silence, including reminding the first subsystem to activate the notification function of the second subsystem after the duration of silence, and activating the notification functions of the second subsystem after the duration of silence using the first subsystem. In some implementations, timer 212 can be coupled to baseband subsystem 104. Baseband subsystem 104 can toggle between suspending the notification functions and activating the notification functions upon receiving a signal from timer 212.

In some implementations, the second subsystem can include a wireless communications subsystem. The wireless communications subsystem can include a device (e.g., a processor or a module of a processor) and an operating system that can process communications using access points in a wireless local area network (e.g., WLAN). The wireless communications subsystem can monitor access points that are located within a communication range of mobile device. The wireless communications subsystem can be configured to notify application subsystem 102 when the wireless communications subsystem detects on or more new access points. The notification can be suspended or activated, responsive to configuration from application subsystem 102.

Optionally, upon configuring the second subsystem mobile device 100 can change (708) an operating mode of the first subsystem (e.g., application subsystem 102) from a first operating mode (e.g., an active operating mode) to a second operating mode (e.g., a power-saving operating mode). Application subsystem 102 can change back into the active operating mode when application subsystem 102 receives a notification from timer 212, a notification from baseband subsystem 104, or a user event.

Mobile device 100 can perform (710) at least the following operations in the first subsystem: mobile device 100 can receive the notification; mobile device 100 can determine that the threshold distance has been satisfied based on the received notification; and mobile device 100 can perform the task upon the determining. The notification can include a current location identifier. The current location identifier can include an MCC of a cellular communication network, an MNC of the cellular communication network, a LAC of the cellular communication network, a cell ID of the cellular communication network, or a media access control (MAC) address of an access point of a wireless communication network. Determining that the threshold distance has been satisfied can include determining a current location of mobile device 100; calculating a travel distance between the current location and the initial location; and determining that the travel distance satisfies the threshold distance.

Figure 8:
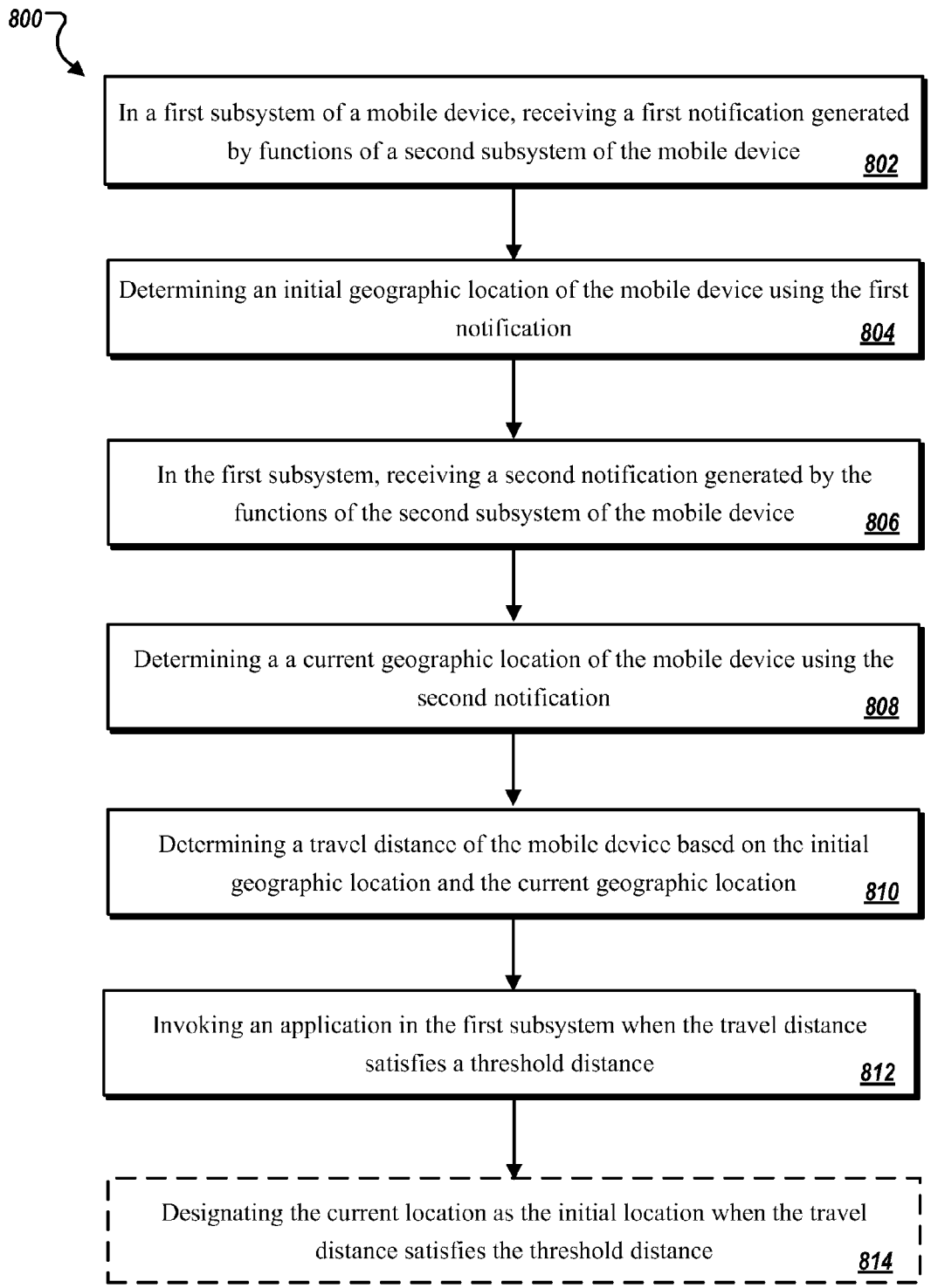
FIG. 8 is a flowchart illustrating a third exemplary process of task management based on travel distance.

FIG. 8 is a flowchart illustrating exemplary process 800 of task management based on travel distance. Exemplary process 800 can be executed on a mobile device (e.g., mobile device 100).

Mobile device 100 can receive (802), in a first subsystem (e.g., application subsystem 102), a first notification generated by a notification function (e.g., location monitoring program 108) of a second subsystem (e.g., baseband subsystem 104 or a wireless communication subsystem) of mobile device 100. The notification can include a location identifier (e.g., a cell ID or a LAC.).

Mobile device 100 can determine (804), in the first subsystem, an initial geographic location of mobile device 100 using the first notification. Mobile device 100 can determine a geographic location based on the location identifier, the geographic location identified by one or more set of geographic coordinates including latitude, longitude, and optionally, altitude. Mobile device 100 can store the geographic location in a storage device (e.g., location data store 230).

Mobile device 100 can receive (806), in the first subsystem, a second notification generated by the notification function of the second subsystem of mobile device 100. The second notification can be triggered by a change of location of mobile device 100, which can cause mobile device 100 to detect a new cell ID, or to detect a new MAC address of a new wireless access point.

Mobile device 100 can determine (808), in the first subsystem, a current geographic location of mobile device 100 using the second notification. The second notification can include a second location identifier (e.g., the new cell ID or new MAC address). Determining the location can include performing a lookup in location data store 230 using the second location identifier extracted from the second notification.

Mobile device 100 can determine (810), in the first subsystem, a travel distance of mobile device 100, based on the initial geographic location and the current geographic location. Determining the travel distance can include determining a linear distance, geodesic distance, or statistically based distance. For example, the distance can be an average of known travel distances of location-aware mobile devices moving between cells determined by GPS functions of the location-aware mobile devices.

Mobile device 100 can invoke (812) an application program in the first subsystem when the travel distance satisfies a threshold distance. When the travel distance does not satisfy the threshold, the first subsystem can be configured to a power-saving operating mode, the power saving operating mode to be effective for a duration of silence. The duration of silence can be determined based on the threshold distance. The notification function can be suspended for the duration of silence.

Optionally, mobile device 100 can designate (814) the current location as a new initial location when the travel distance satisfies the threshold distance. Process 800 can repeat until a user suspends or terminates functions of task management based on travel distance.

Exemplary Mobile Device Architecture

Figure 9:
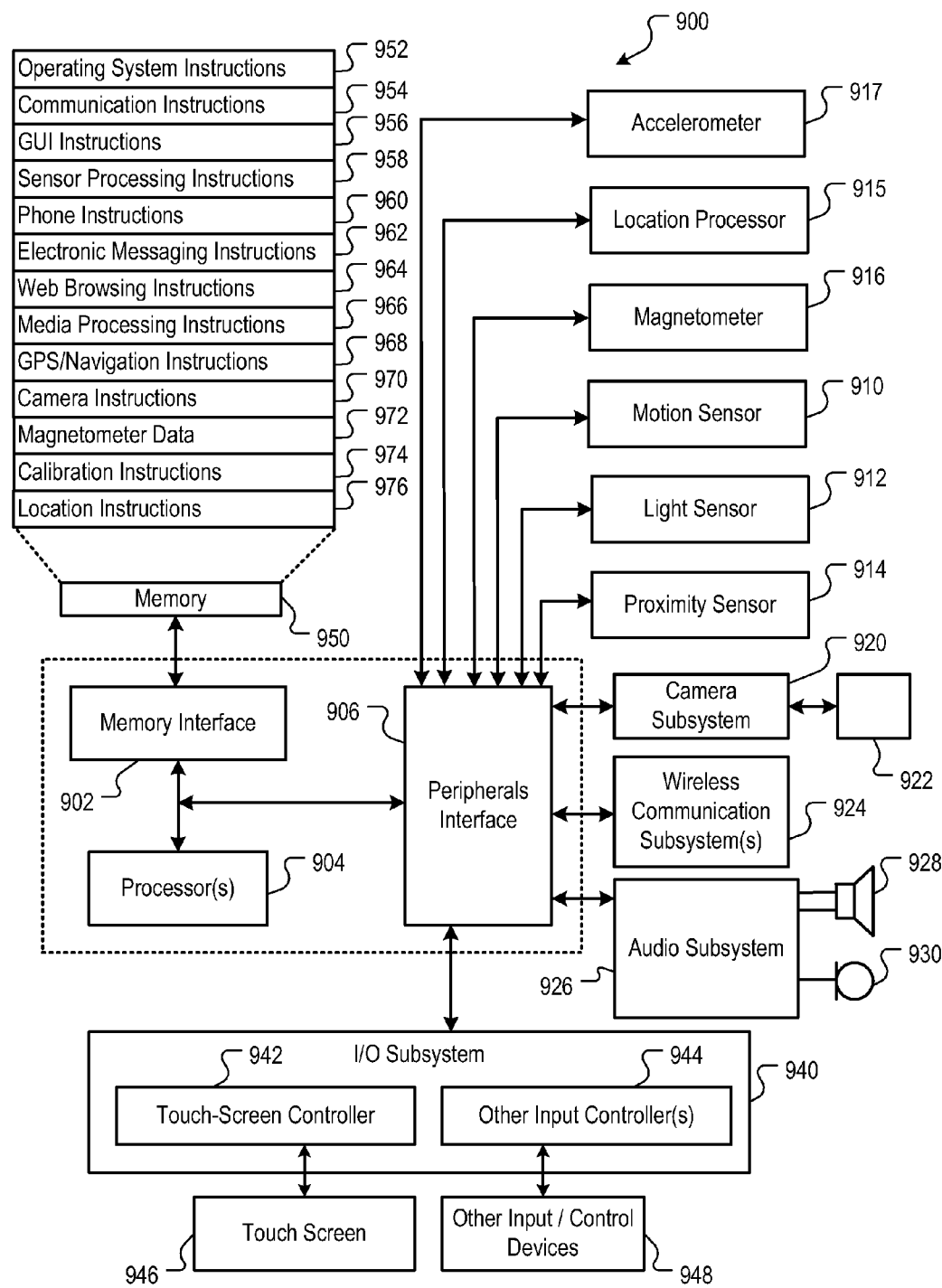
FIG. 9 is a block diagram illustrating an exemplary device architecture of a mobile device implementing the features and operations described in reference to FIGS. 1-8.

FIG. 9 is a block diagram of an exemplary architecture 900 for the mobile devices of FIGS. 1-8. A mobile device can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include application processors (APs) and baseband processors (BPs). The various components in mobile device 100, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to mobile device 100 on or off. The user may be able to customize a functionality of one or more of the buttons. The touch screen 946 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player. Mobile device 100 may include a pin connector. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can include location instructions 976 that can be used to suspend and activate functions for notifying application subsystem 102 of location change, determining a travel distance, determining whether a threshold distance has been satisfied, and determining a duration of silence.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
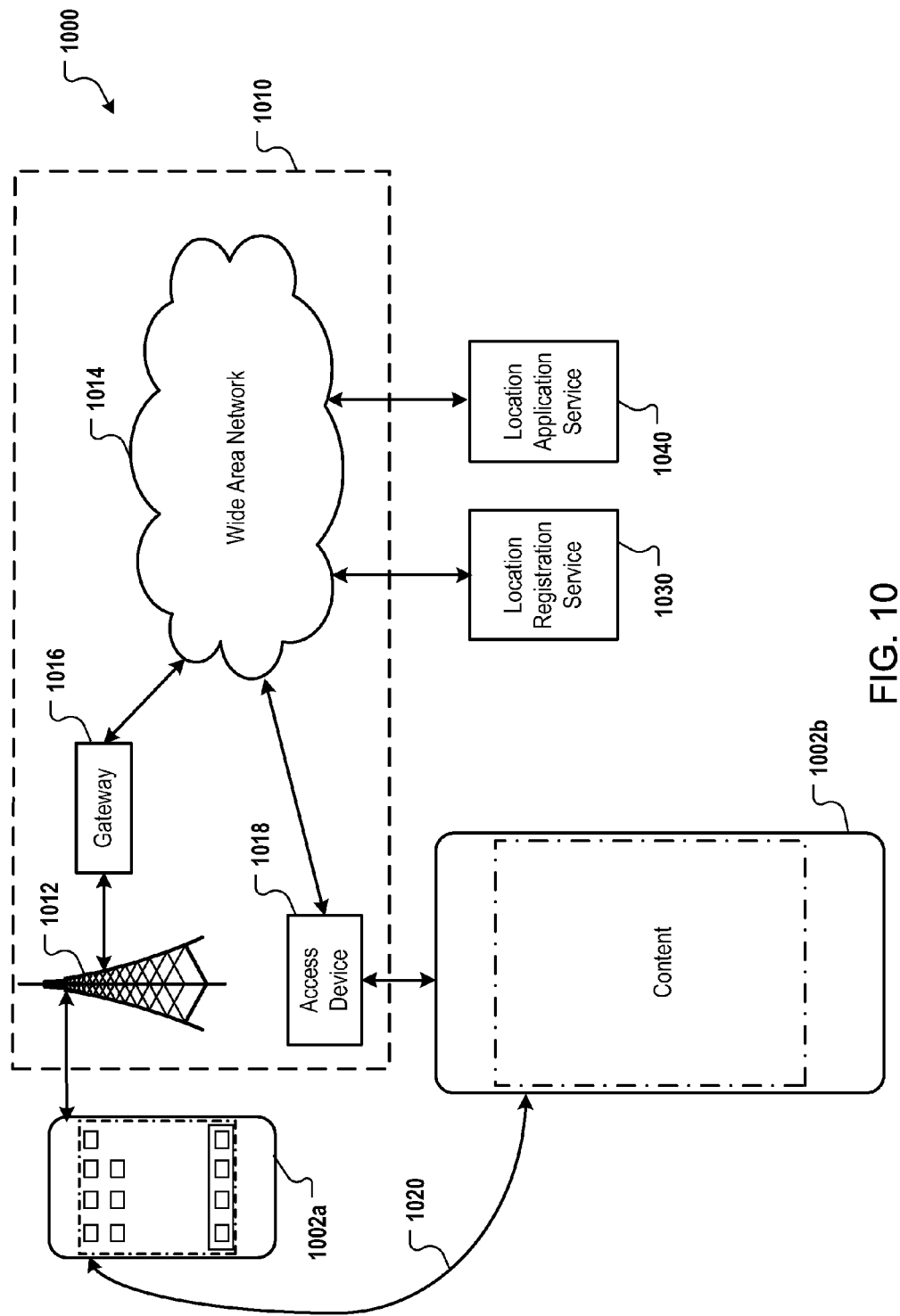
FIG. 10 is a block diagram of an exemplary network operating environment for mobile devices of FIGS. 1-9.

FIG. 10 is a block diagram of an exemplary network operating environment 1000 for the mobile devices of FIGS. 1-9. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access device, can provide communication access to the wide area network 1014.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless device 1002a can communicate with other wireless devices, e.g., other mobile devices 1002a or 1002b, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030 and 1040 over the one or more wired and/or wireless networks. For example, one or more location services 1030 can determine geographic locations of one or more wireless access gateways (e.g., wireless access points or cells). The geographic locations can be stored in association with identifiers of the wireless access gateways in gateway data store 422. Location services 1030 can provide the one or more identifiers to mobile devices 1002.

Location application service 1040 can provide services for downloading various application programs to mobile devices 1002. The application programs can include application programs configured to be invoked or notified when mobile devices 1002 travel various distances.

Mobile device 1002a or 1002b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For example, cells in a communication network are represented as hexagons in the figures. The actual shape of a cell can vary.

What is claimed is:

1. A method, comprising:
    receiving a request to perform a task by a first subsystem of a mobile device when the mobile device travels at least a threshold distance;
    determining a duration of silence of a second subsystem of the mobile device, the second subsystem being operable to monitor a location change of the mobile device using identifiers transmitted in a cellular network as location identifiers, wherein the second subsystem determines that the location change has occurred upon determining a change of location identifiers;
    configuring the second subsystem of the mobile device to send a notification to the first subsystem notifying the first subsystem that the mobile device has traveled, the notification to be sent by a notification function after at least the duration of silence and after the second subsystem determines the change of location identifiers; and in the first subsystem:
receiving the notification;
determining that the threshold distance has been satisfied based on the received notification; and
performing the task upon the determining, wherein performing the task includes at least one of invoking an application program in the first subsystem, or notifying an application program in the first subsystem,
wherein the method is performed by one or more data processing devices.

2. The method of claim 1, wherein:
the first subsystem includes an application subsystem; and
the second subsystem includes a baseband subsystem.

3. The method of claim 1, wherein configuring the second subsystem of the mobile device includes:
suspending the notification functions of the second subsystem; and
activating the notification functions of the second subsystem after the duration of silence.

4. The method of claim 1, wherein determining the duration of silence includes determining the duration of silence based on the threshold distance.

5. The method of claim 1, further comprising:
upon configuring the second subsystem, changing an operating mode of the first subsystem from a first operating mode to a second operating mode.

6. The method of claim 5, wherein:
the first operating mode includes an active operating mode; and
the second operating mode includes a power-saving operating mode.

7. The method of claim 1, wherein the notification includes a current location identifier.

8. The method of claim 7, wherein the current location identifier includes at least one of:
a mobile country code (MCC) of a cellular communication network;
a mobile network code (MNC) of a cellular communication network;
a location area code (LAC) of a cellular communication network;
a cell identifier (cell ID) of a cellular communication network; and
a media access control (MAC) address of an access point of a wireless communication network.

9. The method of claim 1, wherein determining that the threshold distance has been satisfied based on the received notification includes:
determining a current location of the mobile device based on the notification;
calculating a travel distance between the current location and an initial location; and
determining that the travel distance satisfies the threshold distance.

10. A method, comprising:
in a first subsystem of a mobile device, receiving a first notification generated by a notification function of a second subsystem of the mobile device, the second subsystem being operable to monitor a location change of the mobile device using identifiers transmitted in a cellular network as location identifiers, wherein the second subsystem determines that the location change has occurred upon determining a change of location identifiers;
in the first subsystem, determining an initial geographic location of the mobile device using the first notification;
in the first subsystem, receiving a second notification generated by the notification function of the second subsystem of the mobile device;
determining a current geographic location of the mobile device using the second notification;
determining that a travel distance of the mobile device between the initial geographic location of the mobile device and the current geographic location of the mobile device satisfies a threshold distance; and
performing a task by the first subsystem upon the determining, including invoking an application program in the first subsystem or notifying an application program in the first subsystem,
wherein the method is performed by one or more data processing devices.

11. The method of claim 10, wherein:
the first subsystem includes an application subsystem; and
the second subsystem includes a baseband subsystem.

12. The method of claim 10, further comprising configuring the first subsystem to a power-saving mode when the travel distance does not satisfy the threshold, the power saving mode to last a duration of silence, the duration of silence determined based on the threshold distance.

13. The method of claim 12, further comprising suspending the notification function for the duration of silence.

14. The method of claim 10, further comprising designating the current location as a new initial location when the travel distance satisfies the threshold distance.

15. A system, comprising:
a mobile device; and
a non-transitory storage device storing instructions operable to cause the mobile device to perform operations comprising:
receiving a request to perform a task by a first subsystem of the mobile device when the mobile device travels at least a threshold distance;
determining a duration of silence of a second subsystem of the mobile device, the second subsystem being operable to monitor a location change of the mobile device using identifiers transmitted in a cellular network as location identifiers, wherein the second subsystem determines that the location change has occurred upon determining a change of location identifiers;
configuring the second subsystem of the mobile device to send a notification to the first subsystem notifying the first subsystem that the mobile device has traveled, the notification to be sent by a notification function after at least the duration of silence and after the second subsystem determines the change of location identifiers; and
in the first subsystem:
receiving the notification;
determining that the threshold distance has been satisfied based on the received notification; and
performing the task upon the determining, wherein performing the task includes at least one of invoking an application program in the first subsystem, or notifying an application program in the first subsystem.

16. The system of claim 15, wherein:
the first subsystem includes an application subsystem; and
the second subsystem includes a baseband subsystem.

17. The system of claim 15, wherein performing the task includes at least one of:
  invoking an application program in the first subsystem; and
  notifying an application program in the first subsystem.

18. The system of claim 15, wherein configuring the second subsystem of the mobile device includes:
  suspending the notification functions of the second subsystem;
  configuring a timer to activate the first subsystem after the duration of silence; and
  activating the notification functions of the second subsystem after the duration of silence using the first subsystem.

19. The system of claim 15, wherein determining the duration of silence includes determining the duration of silence based on the threshold distance.

20. The system of claim 15, further comprising:
  upon configuring the second subsystem, changing an operating mode of the first subsystem from a first operating mode to a second operating mode.

21. The system of claim 20, wherein:
  the first operating mode includes an active operating mode; and
  the second operating mode includes a power-saving operating mode.

22. A non-transitory storage device storing instructions operable to cause a data processing device to perform operations comprising:
  receiving a request to perform a task by a first subsystem of a mobile device when the mobile device travels at least a threshold distance;
  determining a duration of silence of a second subsystem of the mobile device, the second subsystem being operable to monitor a location change of the mobile device using identifiers transmitted in a cellular network as location identifiers, wherein the second subsystem determines that the location change has occurred upon determining a change of location identifiers;
  configuring the second subsystem of the mobile device to send a notification to the first subsystem notifying the first subsystem that the mobile device has traveled, the notification to be sent by a notification function after at least the duration of silence and after the second subsystem determines the change of location identifiers; and
  in the first subsystem:
    receiving the notification;
    determining that the threshold distance has been satisfied based on the received notification; and
    performing the task upon the determining, wherein performing the task upon the determining performing the task includes at least one of invoking an application program in the first subsystem, or notifying an application program in the first subsystem.

23. The non-transitory storage device of claim 22, wherein:
  the first subsystem includes an application subsystem; and
  the second subsystem includes a baseband subsystem.

24. The non-transitory storage device of claim 22, wherein performing the task includes at least one of:
  invoking an application program in the first subsystem; and
  notifying an application program in the first subsystem.

* * * * *